United States Patent
Towle (12) United States Patent (10) Patent No.: US 8,127,896 B2
Towle (45) Date of Patent: Mar. 6, 2012

(54) CANTILEVER BRAKE DEVICE

(75) Inventor: Daniel Towle, Seattle, WA (US)

(73) Assignee: Bikebiz III, Inc., Seattle, WA (US)

( * ) Notice: Subject to any disclaimer, the term of this patent is extended or adjusted under 35 U.S.C. 154(b) by 375 days.

(21) Appl. No.: 12/404,269

(22) Filed: Mar. 13, 2009

(65) Prior Publication Data
US 2009/0229929 A1 Sep. 17, 2009

Related U.S. Application Data

(60) Provisional application No. 61/037,307, filed on Mar. 17, 2008.

(51) Int. Cl.
*B62L 3/00* (2006.01)
(52) U.S. Cl. .................................................. 188/24.21
(58) Field of Classification Search .................. 188/2 D, 188/24.11–24.15, 24.19, 24.21, 24.22
See application file for complete search history.

(56) References Cited

U.S. PATENT DOCUMENTS

| | | | | |
|---|---|---|---|---|
| 4,136,759 A | * | 1/1979 | Schoch | 188/24.12 |
| 5,538,107 A | * | 7/1996 | Lumpkin | 188/24.21 |
| 5,649,609 A | * | 7/1997 | Li et al. | 188/24.19 |
| 5,775,466 A | * | 7/1998 | Banyas et al. | 188/24.21 |
| 6,039,153 A | * | 3/2000 | Sugimoto | 188/24.22 |

* cited by examiner

*Primary Examiner* — Xuan Lan Nguyen
(74) *Attorney, Agent, or Firm* — Miller Nash LLP (57) ABSTRACT

A cantilever brake device is disclosed having a pair of opposing brake arm assemblies with cable tension or the traction point at the distal end of the body members at the bottom trunk portions rather than at the upper level by the adjustable arm members. By moving the cable tension and traction point to the bottom level of the body members, the brakes are applied more evenly and uniformly against and onto the rim surface for greater braking power and mechanical advantage. The cantilever brake device is also disclosed having a shoe housing member that is easily adjustable on a y-axis for height adjustment of the brake shoes since the brake shoes are each mounted on the shoe housing member and allows uniform adjustment of both shoe housing members holding the brake shoes. The shoe housing member is easily rotatable to modify the pitch angle of the brake shoes on a pivotal, horizontal axis to align the brake pads squarely against the rim surface so that the top and bottom portions of the brake pads touch the rim surface equally and uniformly when brakes are applied. Consequently, all of the vertical, horizontal, roll angle, pitch angle, and toe-in adjustments are easily achievable for fine tuning the brakes by using the present cantilever brake device.

20 Claims, 4 Drawing Sheets

FIG. 4

CANTILEVER BRAKE DEVICE

CROSS-REFERENCE TO RELATED APPLICATION

The present application is an application claiming the benefit under 35 USC Section 119(e) of U.S. Provisional Patent Application Ser. No. 61/037,307, filed Mar. 17, 2008. The present application is based on and claims priority from the provisional application, the disclosure of which is hereby expressly incorporated herein by reference in its entirety.

BACKGROUND OF THE INVENTION

The present invention relates generally to a brake device for a bicycle. More specifically, the present invention is directed to a cantilever brake device.

Different brake devices are adapted into different bicycles whether used for off-roading, touring, or a combination of both, to provide a stable and reliable braking device to accommodate the user's needs. Larger bicycles such as tandem, travel, or loaded touring bicycles, typically require stronger braking devices due to the added weight of a passenger, touring necessities, or a combination of both. Therefore, it is highly desirable to have a braking apparatus that is powerful, easily adjustable and highly reliable.

Mountain bicycles typically use what are called V-brakes® (also referred to as direct-pull cantilever brakes) and discbrakes which are specifically designed for off-road use. V-brakes® are basically direct-pull cantilever brakes using a single cable with the arms extending straight upward. The cable housing connects to one arm while the inner cable runs across the top of the tire to the opposite arm to an anchor bolt. V-brakes® operate by pulling the brake cable from the side or applying the brake, thereby the housing pushes against on a cantilever arm while the inner cable pulls the other cantilever arm towards the rim surface of the tire. V-brakes® are a side-pull design rather than a center-pull design. Disc brakes basically utilize a metal disc that is attached to the wheel hub and rotates with the wheel for stopping the rotation of a wheel. A brake disc or calipers made of different materials are attached to the frame or fork with pads that squeeze together on the disc for stopping the wheel. Even though many mountain bicycles use and tandem bicycle manufacturers install V-brakes® or disc brakes, many of these brakes require frequent adjustment or complete replacement since these V-brakes® or disc brakes are not the most durable brakes, particularly for tandem bicycles and touring bicycles with added weight for touring or traveling.

The problem with V-brakes® is that they require special long-pull low tension levers rather than the standard shortpull high tension levers normally installed on bicycles, and are not compatible with any standard bicycle brake levers. V-brakes® are more acceptably used on mountain bicycles because users do not typically travel long distances. For touring and tandem bicycles, it is common for a user to ride more than 50 miles per day and travel long distances. Especially for an off-road situation, the weight of the rider and the bicycle can easily add up to 175 pounds, if not more. However, a touring bicycle with its rider and essentials for touring can easily weigh up to 250 pounds and well over 400 pounds on a loaded tandem bicycle. The typical conditions of off-roading include terrain of loose dirt and mud with the most high speed reached at around 25 miles per hour. V-brakes® have pads that are very thin, approximately 2 mm, which can wear out quickly for long distances. In comparison, cantilever brakes typically have brake pads that have at least twice as much thickness or 5-10 mm before the pads wear out. The V-brake pads have an approximate life time of 250 to 300 miles while the cantilever pads can last for thousands of miles before they are completely worn out. Therefore, it is highly desirable to have brakes that are less expensive, and last substantially longer than V-brakes® to accommodate heavier bicycles or bicycles with a heavier load over an extended period of travel.

Disc brakes are also problematic in that the discs and the calipers used to stop the disc increase the weight of the bicycle which is not preferred for touring or traveling bicycles. Furthermore, disc brakes stop the wheel of a bicycle at the hub which causes additional stress on the spokes, rim and frame at which point the wheel also attaches. In order to accommodate the heavier disc brakes, heavier chain and seat components are required, and a brace is additionally required to be installed to avoid the frame's tendency to break. All of these added components contribute to increased weight of the bicycle. Disc brakes are not as desirable for touring and tandem bicycles since they can hinder easy packing of the bicycles due to the bulky rotors. Disc brakes also create noise caused by the inevitable and slight warping of the disc and require frequent adjustment which is not a viable option for users touring and biking for a long distance. Therefore, it is highly desirable to have brakes without requiring the added bulk and weight of associated disc brake components, while providing brakes that are lighter, easier to adjust, less expensive, and last substantially longer than disc brakes to accommodate heavier bicycles or bicycles with a heavier load over an extended period of travel.

Traditional center-pull cantilever brakes were invented for touring and tandem bicycles decades before mountain bikes were created. Traditional cantilever brakes use two cables with a main cable running down the centerline of a bicycle, and the second transverse cable connecting the cantilever members on each side of the wheel. By applying the brakes or pulling the main line upwards, thereby pulling the middle of the transverse cable, the ends of the cantilever members, on which the transverse cables are anchored, cause inward pivotal movement of the brake shoes to touch the rim surface of the wheels. Because cantilever brakes typically have straight body members with an already fixed angle of the arms protruding outwardly from the body members at the top portion, also on which the transverse cables are attached to the top ends, the only way to accommodate wider frames such as tandem bicycles or other bicycle frames is to adjustably move the brake shoes closer to the rim surface. A problem remains in that the closer the brake shoes are to the rim surface and farther away from the shoe housing and the cantilever brake body members, the less stable are the brake pads to effectively stop the wheels. It is therefore desirable to have improved brakes that are easily adjustable without compromising the stability of braking power for any bicycles and bicycle frames with wider-spaced forks or frames.

A common problem exists to which there is no immediate solution whereby brakes create high squeaking noise caused by friction between the brake pads and the rim surface, thereby flexing the brake arms which are repeated at high speeds until the bicycle slows down or halts to a complete stop. This squealing problem is exacerbated when the brake shoes are moved closer to the rim surface due to wider frames and usual wear and tear associated with the brake pads. It is therefore highly desirable to have a brake design that avoids increased flexing of the brake shoes and squealing noise with sturdy, rigid support to stabilize the brake pads without having to move the brake shoes closer in to the rim surface. Because there is loss of braking power by moving the brake shoes in excessively without moving the other brake components with the brake shoes, the present invention is much more advantageous in design without requiring the brake shoes to be moved in excessively for adjustment.

Center-pull cantilever brakes are typically pulled at the arms, the top ends of the body units, while pivoting points are below the rim surface on the bottom ends of the body units which are normally attached to the fork section of the bicycle frame. While pulling the cable upwards and pivoting the cantilever body units with attached brake shoes for the inward braking action, the brake pads are primarily pulled upwards to the rim surface resulting in significant braking power. It is therefore highly desirable to design cantilever brakes to avoid losing significant braking power by utilizing different pulling, tension points to bring the brake pads evenly into contact with the rim surface.

Adjusting the toe of the brake pads for proper function by contact with the rim surface of the wheel is crucial for any brake. The brake shoe adjustment refers to different ways by which the brake shoes can be adjusted to work best for contacting the rim surface for the braking action. Adjusting the height of the brake shoes is critical because the brake shoes need to be perfectly aligned so that the brake pads touch the rim surface when engaged rather than the tire or the spokes. Adjusting the horizontal distance of the brake shoes to and from the rim surface with reasonable distance is also required for the brake pads to come into contact with the rim surface when the brakes are applied.

The roll angle typically refers to adjusting the brake shoes on a pivotal, vertical axis to touch and follow the slight curvature of the rim surface as closely as possible when the brakes are applied. The pitch angle typically refers to adjusting the brake shoes on a pivotal, horizontal axis to align the pads squarely against the rim surface so that the top and bottom portions of the brake pads touch the rim surface equally for maximum braking power when the brakes are applied.

The toe-in adjustment refers to the adjustment of the brake shoes and brake pads so that the front edge of the brake shoes contacts the rim surface slightly before the rear edge when the brakes are applied to decrease the squealing noise while increasing the braking power without affecting the other angles to avoid diminishing any braking function. These adjustments of the brake shoes for optimal performance is a very difficult task for any bike mechanic or adjuster to fine tune all of the adjustments and to secure the various adjustments without affecting other positions. The currently existing cantilever brakes do not have easily adjustable components for fine tuning all of the adjustments. A problem with the currently existing cantilever brakes is that the adjustments are predisposed to set into certain positions. The brake shoes currently used with existing cantilever brakes allow the adjustments to fall into pre-set notches or positions so that fine tuning of all of the different adjustments is not possible with current designs. Therefore, it is highly desirable to have a cantilever brake design with easy angle, height, and extension adjustments of the brake shoes and brake pads without setting into preset positions and readily securing the various adjustments for optimal performance, stability, rigidity, and increased braking power with reduced squealing noise.

BRIEF SUMMARY OF THE INVENTION

The above-described problems are solved and a technical advance achieved by the present cantilever brake device. The present brakes provide a durable design with improved features for ease of adjustment, reduction of squeaking noise, increase of braking power and tension, and cable traction. The features of the brakes, particularly the adjustable angle of the arm members, cable tension and traction at the bottom of the device, easy adjustability of the brake shoes at all levels, and rigid shoe housing members supporting the brake shoes, offer numerous advantages over traditional brakes or cantilever brake devices. The advantages stem from the angle adjustment of the arm members, cable tension and traction point at the distal end, and easy adjustability of the brake shoes.

A cantilever brake device is disclosed having a pair of adjustable arm members to accommodate wider frames of bicycles. The adjustable arm members comprise a bottom portion that attaches to the upper body portion by an attachment that is pivotally adjustable through a range of angles from the body member to accommodate the width of the fork frame. By having angle adjustment at the arm members at the upper end of the cantilever brake device, the requirement to move the brake shoes in excessively to the rim surface is avoided. The brake shoes being placed farther away from the shoe housing member destabilizes the brakes due to excessive deflection of the brake pads. The adjustable angle feature of the arm members instead contributes greatly to optimal brake performance, reduction of squeaking noise, increased braking power and rigid support from the shoe housing member positioned closely behind the brake shoes.

The cantilever brake device is also disclosed having the cable tension or traction point at the distal end of the body members at the bottom trunk portions rather than at the upper level by the adjustable arm members. By moving the cable tension and traction point down to the bottom of the body members by the bottom trunk portions, the brakes are applied more evenly and uniformly against and onto the rim surface for greater braking power and mechanical advantage.

The cantilever brake device has a pair of opposing brake arm assemblies with each brake arm assembly having a shoe housing member that is easily adjustable on a y-axis for height adjustment of the brake shoe since the brake shoe is each mounted on the shoe housing member and allows uniform adjustment of both the shoe housing member and the brake shoes. The shoe housing member is also rotatable to modify the pitch angle of the brake shoes on a pivotal, horizontal axis to align the brake pads squarely against the rim surface so that the top and bottom portions of the brake pads touch the rim surface equally and uniformly when brakes are applied. The body member comprises a cylindrical shape over which the shoe housing member is mounted for rotating around the body member and moving in a vertical direction for positioning of the brake pads for alignment with the rim surface of the bicycle.

The cantilever brake device is also disclosed having a brake shoe that is adjustably inserted through or mounted on the head portion of the attaching means which is attached to the shoe housing member for readily adjusting the brake shoe on an x-axis. The attaching means comprises a head portion with an opening through which a brake support is positioned laterally through the opening of the head portion prior to tightly engaging the brake support to the shoe housing member. The brake shoes are additionally adjustable to easily modify the roll angle and pitch angle on the pivotal y- and x-axis of the brake shoes. Consequently, all of the vertical, horizontal, roll angle, pitch angle, and toe-in adjustments are easily achievable for fine tuning the brakes by using the present cantilever brake device.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

The invention is better understood in view of the accompanying drawing figures, in which like reference numerals refer to like elements throughout the following detailed description of the invention section. The accompanying drawings, which are incorporated in and constitute a part of this specification, illustrate various exemplary embodiments.

Similar reference characters denote corresponding features consistently throughout the attached drawings.

DETAILED DESCRIPTION OF THE INVENTION

As commonly mentioned in the description to describe the movement of the various components in different directions, a movement in a y-axis pertains to the vertical direction from top to bottom or bottom to top. Movement in an x-axis pertains to the horizontal direction from left to right or right to left. Movement in a z-axis pertains to the horizontal direction from front to back or back to front. Furthermore, the roll angle pertains to angle adjustment on a vertical axis, and the pitch angle pertains to angle adjustment on a horizontal axis.

A cantilever brake device 10 comprises a pair of opposing brake arm assemblies with a pair of adjustable arm members 20a, 20b, a pair of body members 30a, 30b, a pair of shoe housing members 40a, 40b, a pair of brake supports 65a, 65b, a pair of brake shoes 60a, 60b, a pair of brake pads 62a, 62b, a pair of trunk portions 50a, 50b, a pair of coil springs 51a, 51b, and a pair of spring adjusters 52a, 52b. The specification herein may refer to a pair of components or to each component of the pair in describing the various parts of the cantilever brake device 10 which should be understood to have the same meaning and description.

Figure 1:
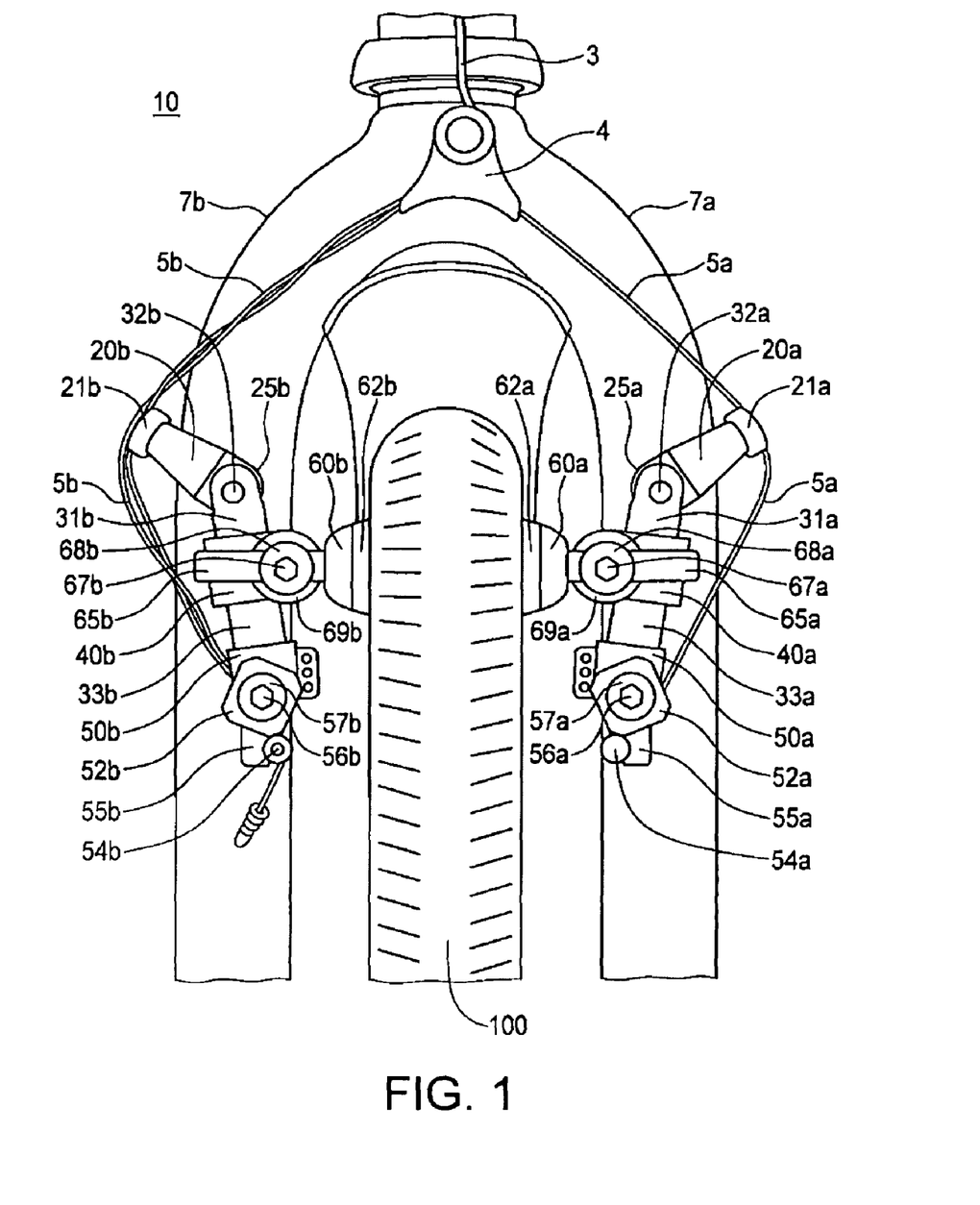
FIG. 1 is a front view of a cantilever brake device of the present invention shown mounted on a bicycle frame and on opposite sides of a bicycle wheel.
Figure 2:
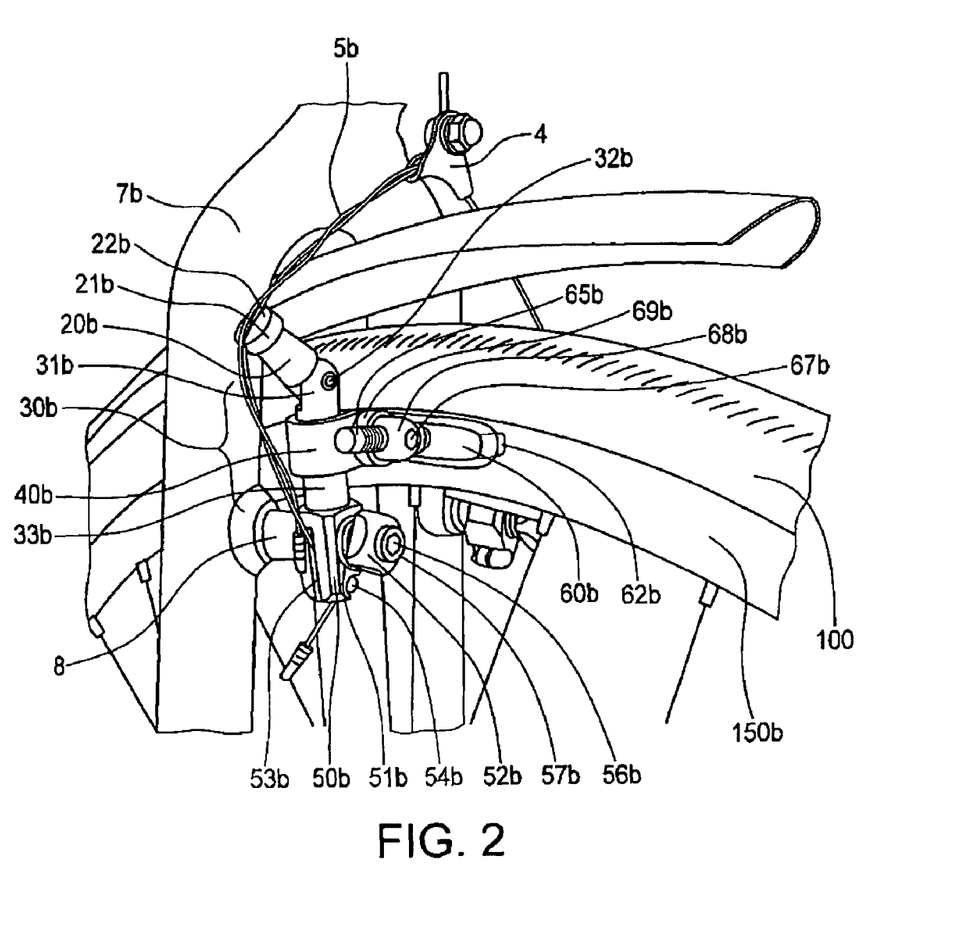
FIG. 2 is a side perspective side view of a cantilever brake device of the present invention shown mounted on a bicycle frame and on a left side a bicycle wheel.

A cantilever brake device 10 pertaining to one embodiment of the present invention is illustrated in FIGS. 1 and 2. FIG. 1 shows a front view of the cantilever brake device 10 mounted on a bicycle fork frame 7a, 7b and on opposite sides of a bicycle tire 100 near the rim surfaces 150a, 150b (not shown in FIG. 1). Each assembly on the opposing sides is referred to as a brake arm assembly which will be used to describe the left assembly or the right assembly. Each brake arm assembly of the cantilever brake device 10 has an adjustable arm member 20a, 20b on opposite sides with cone-shaped or cylindrical top portions of the arm members 21a, 21b. Alternatively, the top portions of the arm members 21a, 21b may have other shapes. The adjustable arm members 20a, 20b are pivotally attached to the upper body portion 31a, 31b of the body members 30a, 30b to allow angle adjustment of the arm members 20a, 20b to accommodate various widths of bicycle fork frames. The attachment 35a, 35b with the ends 32a, 32b between the adjustable arm members 20a, 20b to the upper body portion 31a, 31b are shown in detail and more readily understood in FIG. 2.

The adjustable arm members 20a, 20b comprise a bottom portion 25a, 25b that attaches to the upper body portion 31a, 31b by the attachment 35a, 35b which is pivotally adjustable through a range of angles from the body members 30a, 30b to accommodate the width of the fork frame 7a, 7b. The adjustable arm members 20a, 20b can accommodate wider fork frames by pivoting the adjustable arm members 20a, 20b angularly and downwardly from a vertical angle to as far as a perpendicular angle or transversely with respect to the body members 30a, 30b to find the best angle for the bicycle fork frame 7a, 7b without moving the brake shoes 60a, 60b in excessively. The adjustable arm members 20a, 20b can be adjusted anywhere from a vertical position to a horizontal position facing oppositely and away from one another prior to tightly engaging the arm members 20a, 20b to the upper body portions 31a, 31b. The example as shown in FIG. 1 illustrates the adjustable arm members 20a, 20b at approximately a 45 degree angle from the ground and with respect to the body members 30a, 30b. These angle adjustments by pivoting the arm members 20a, 20b away from one another can be easily made without limiting the cantilever brake device 10 to one fixed angle. Further, the attachment of the bottom portion 25a, 25b of the arm members 20a, 20b to the upper body portion 31a, 31b is pivotally adjustable so as to reduce noise caused by excessive deflection of a brake pad 62a, 62b for alignment with the rim surface 150a, 150b of the bicycle.

Continuing down the cantilever brake device 10, the middle attached portions of each of the brake arm assemblies are a pair of body members 30a, 30b which are substantially cylindrically shaped. Each body member 30a, 30b with an upper body portion 31a, 31b and lower body portion 33a, 33b also holds a shoe housing member 40a, 40b. The shoe housing member 40a, 40b is adjustably mounted on and around the circular shape of the body members 30a, 30b at any height position on the body members 30a, 30b for vertically adjusting to the rim surfaces 150a, 150b (not shown in FIGS. 1-2) of the bike tire 100. The body member 30a, 30b comprises a cylindrical shape over which the shoe housing member 40a, 40b is mounted for rotating around the body member 30a, 30b and moving in a vertical direction for positioning of the brake pads 62a, 62b for alignment with the rim surface of the bicycle. Each shoe housing member 40a, 40b is easily adjustable vertically on a y-axis for height adjustment of the brake shoes 60a, 60b since the brake shoes 60a, 60b are mounted on the shoe housing members 40a, 40b and allows uniform vertical adjustment of both the shoe housing members 40a, 40b and brake shoes 60a, 60b at the same time. Each brake shoe 60a, 60b has a permanently secured brake pad 62a, 62b to touch the rim surface when the brakes are applied.

The shoe housing member 40a, 40b is substantially a U-shaped structure wrapping around the cylindrical body member 30a, 30b with an opening on a z-axis to accommodate an attaching means 68a, 68b therethrough. Each shoe housing member 40a, 40b is also rotatable around the body member 40a, 40b that can easily modify the pitch angle of the brake shoes 60a, 60b on a pivotal, horizontal axis to align the brake pads 62a, 62b squarely against the rim surface 150a, 150b so that the top and bottom portions of the brake pads 62a, 62b touch the surface equally when the brakes are applied. By adjusting the pitch angle using the shoe housing member 40a, 40b rotated circumferentially around the body members 30a, 30b, the toe-in adjustment is easily achieved so that the front edge of the brake shoes 60a, 60b on which the brake pads 62a, 62b are located contacts the rim surface 150a, 150b slightly before the rear edge of the brake pads 62a, 62b to decrease squealing when the brakes are applied.

Figure 4:
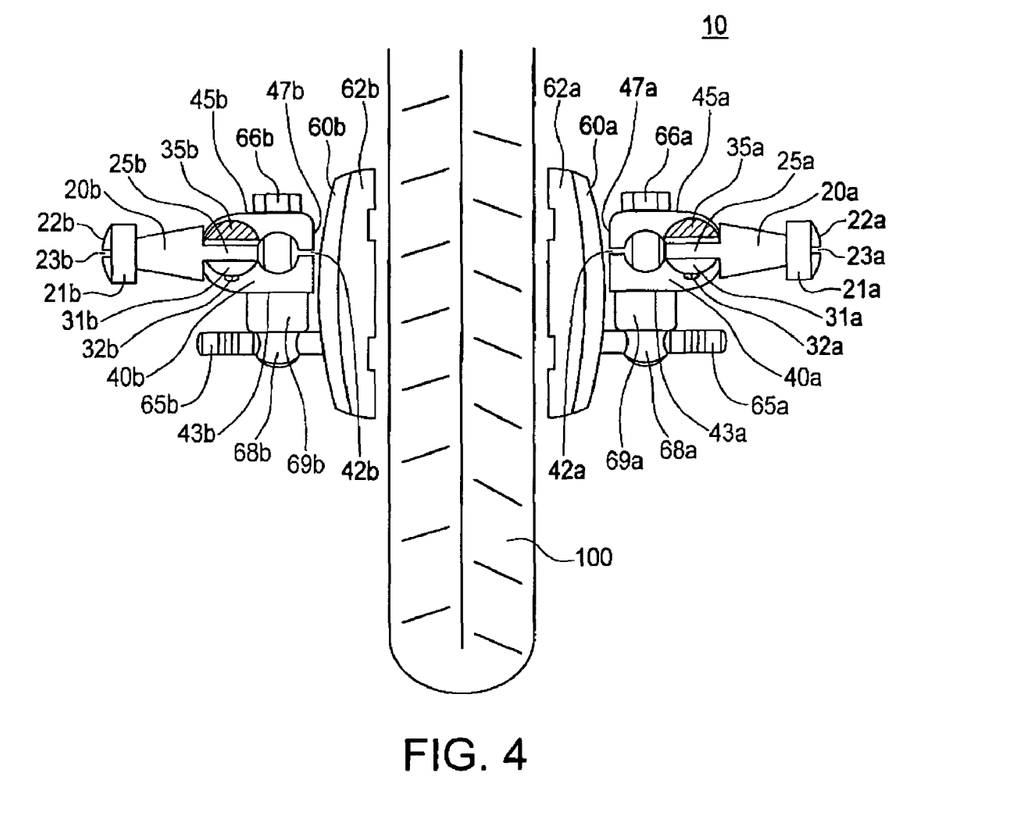
FIG. 4 is a top view of a cantilever brake device of the present invention shown on opposite sides of a bicycle wheel.

In the examples as shown in FIGS. 1-2, the head portion of the attaching means 68a, 68b protrudes outwardly on a z-axis from the front with a near side 43a, 43b of the shoe housing member 40a, 40b to the back with a distal side 45a, 45b of the shoe housing member 40a, 40b on which a fastener 66a, 66b tightly and threadably engages the threaded end portion of the attaching means 68a, 68b on the distal side 45a, 45b. The shoe housing member 40a, 40b is substantially a U-shaped structure with a near side 43a, 43b (shown in FIG. 4), a distal side 45a, 45b (shown in FIG. 4), and an inner side 47a, 47b (shown in FIG. 4) that wraps around the body member 30a, 30b. A fastener 66a, 66b is a nut or a similar structure that is tightly engaged on the distal side 45a, 45b of the shoe housing member 40a, 40b. Each shoe housing member 40a, 40b has an opening on a z-axis on the inner portion or near the tire 100 through which a bolt-like or other similar attaching means 68a, 68b is inserted with the larger head portion catching tightly against the near side 43a, 43b of the shoe housing member 40a, 40b and the fastener 66a, 66b (as shown in FIG. 4) is used for tightening and loosening the shoe housing member 40a, 40b around the body member 30a, 30b at the distal end 45a, 45b. The end portion (not shown) of the attaching means 68a, 68b is threadable so that the fastener 66a, 66b can be threadably engaged to the attaching means 68a, 68b at the end portion of the attaching means 68a, 68b. An optional washer positioned between the fastener 66a, 66b and the distal side 45a, 45b of the shoe housing member 40a, 40b can be used. The optional washer may be an independent piece or a built-in-piece on the distal side 45a, 45b of the shoe housing member 40a, 40b.

The head portion of the attaching means 68a, 68b also has an opening in the x-axis and in the same direction as the shoe housing member 40a, 40b through which the brake support 65a, 65b is transversely inserted therethrough and adjusted prior to tightly engaging the brake shoes 60a, 60b and brake pads 62a, 62b on each side of the tire 100. A spacer 69a, 69b is circularly shaped with a center opening through which the body of the attaching means 68a, 68b is inserted. The spacer 69a, 69b is removably placed between the head portion of the attaching means 68a, 68b and the near side 43a, 43b of the shoe housing member 40a, 40b to push against the brake support 65a, 65b to hold the brake shoes 60a, 60b, and thereby the brake pads 62a, 62b, in place when the fastener 66a, 66b is threadably engaged tightly against the end portion of the attaching means 68a, 68b on the distal side 45a, 45b of the shoe housing member 40a, 40b.

The head portion of the attaching means 68a, 68b also has an aperture 67a, 67b at the front side that is hexagonally shaped through which an allen wrench or similar tool can be used to hold the attachment means 68a, 68b while tightening or loosening the fastener 66a, 66b against the end portion (not shown) of the attaching means 68a, 68b against the distal side 45a, 45b of the shoe housing member 40a, 40b. Prior to tightening the fastener 66a, 66b against the end portion of the attaching means 68a, 68b against the distal side 45a, 45b (as shown in FIG. 4) of the shoe housing member 40a, 40b, the height of the shoe housing member 40a, 40b may be adjusted. Further, the pitch angle of the brake shoes 60a, 60b and thereby the attached brake pads 62a, 62b may be adjusted closely against the rim surfaces 150a, 150b before the fastener 66a, 66b is tightly engaged to the end portion of the attaching means 68a, 68b against the distal side 45a, 45b of the shoe housing member 40a, 40b. The brake shoes 60a, 60b may also be adjusted to modify the roll angle by adjusting the brake support 65a, 65b prior to tightly engaging the fastener 66a, 66b against the end portion of the attaching means 68a, 68b against the distal side 45a, 45b of the shoe housing member 40a, 40b. The brake shoes 60a, 60b and the brake pads 62a, 62b are adjusted angularly on the y-axis or in a vertically angular direction by adjusting the brake support 65a, 65b before the fastener 66a, 66b is tightened to position the brake pads 62a, 62b against the rim surfaces 150a, 150b.

Therefore, the brake shoes 60a, 60b, and the brake pads 62a, 62b are adjustable vertically, angularly at the y-axis, horizontally, and angularly at the x-axis without having to move the brake shoes 60a, 60b in excessively. All of the vertical, horizontal, roll angle, pitch angle and toe-in adjustments are easily achievable for fine tuning the brake shoes 60a, 60b and the brake pads 62a, 62b against the rim surfaces 150a, 150b for precise braking.

Continuing down below the body members 30a, 30b, the body members 30a, 30b are attached to the trunk portions 50a, 50b which are substantially rectangular in shape. As more readily illustrated in FIG. 2, the back end of the trunk portions 50a, 50b is attached to the fork frame 7a, 7b of the bicycle. All bicycles have protruding projections to fit tightly with any brake apparatus and hold the brake apparatus in place. As shown in FIG. 2, the trunk portions 50a, 50b of the cantilever brake device 10 are attached to the fork frame 7a, 7b and are supported by the fork frame 7a, 7b of the bicycle. The coil spring 51a, 51b is attached to the trunk portions 50a, 50b between the front side of the trunk portions 50a, 50b and the spring adjuster 52a, 52b, biased to maintain the brake arm assembly in an open, non-braking action. The connector 57a, 57b connects the cantilever brake device 10 to the fork frame 7a, 7b of the bicycle and simultaneously adjusts the spring adjuster 52a, 52b for spring tension adjustment. The connector 57a, 57b extends into the fork frame 7a, 7b of the bicycle and securely engages the cantilever brake device 10 against the fork frame 7a, 7b. The connector 57a, 57b also has a recess 56a, 56b at the front side that is hexagonally shaped through which an allen wrench or similar tool can be used to tighten or loosen the connector 57a, 57b against the fork frame 7a, 7b as well as to adjust the spring tension.

As shown in FIGS. 1 and 2, the main cable 3 from the brakes attaches to a splitter 4 and splits into a pair of transverse cables 5a, 5b on each side of the bicycle tire 100. The transverse cables 5a, 5b attach to the cantilever brake device 10 on each side of the brake arm assemblies. More specifically, the transverse cables 5a, 5b on each side fits through a slit 23a, 23b (shown in FIG. 4) that is located on the upper surface of the top portion 22a, 22b of the adjustable arm members 20a, 20b and continues down to the inlets 53a, 53b of the trunk portions 50a, 50b to latch onto the inner, curved side of the bottom trunk portions 55a, 55b for secure attachment to the brake arm assemblies. The trunk portions 50a, 50b of the body members 30a, 30b comprise bottom trunk portion 55a, 55b with an inlet 53a, 53b at the distal end of the cantilever brake device 10 to detachably receive and secure the transverse cables 5a, 5b. The transverse cables 5a, 5b with the cable notches 54a, 54b detachably latch onto the bottom trunk portions 55a, 55b to push the brake pads 62a, 62b inwardly against the rim surfaces 150a, 150b when the brakes are activated or pulled at the top by a user.

Figure 3:
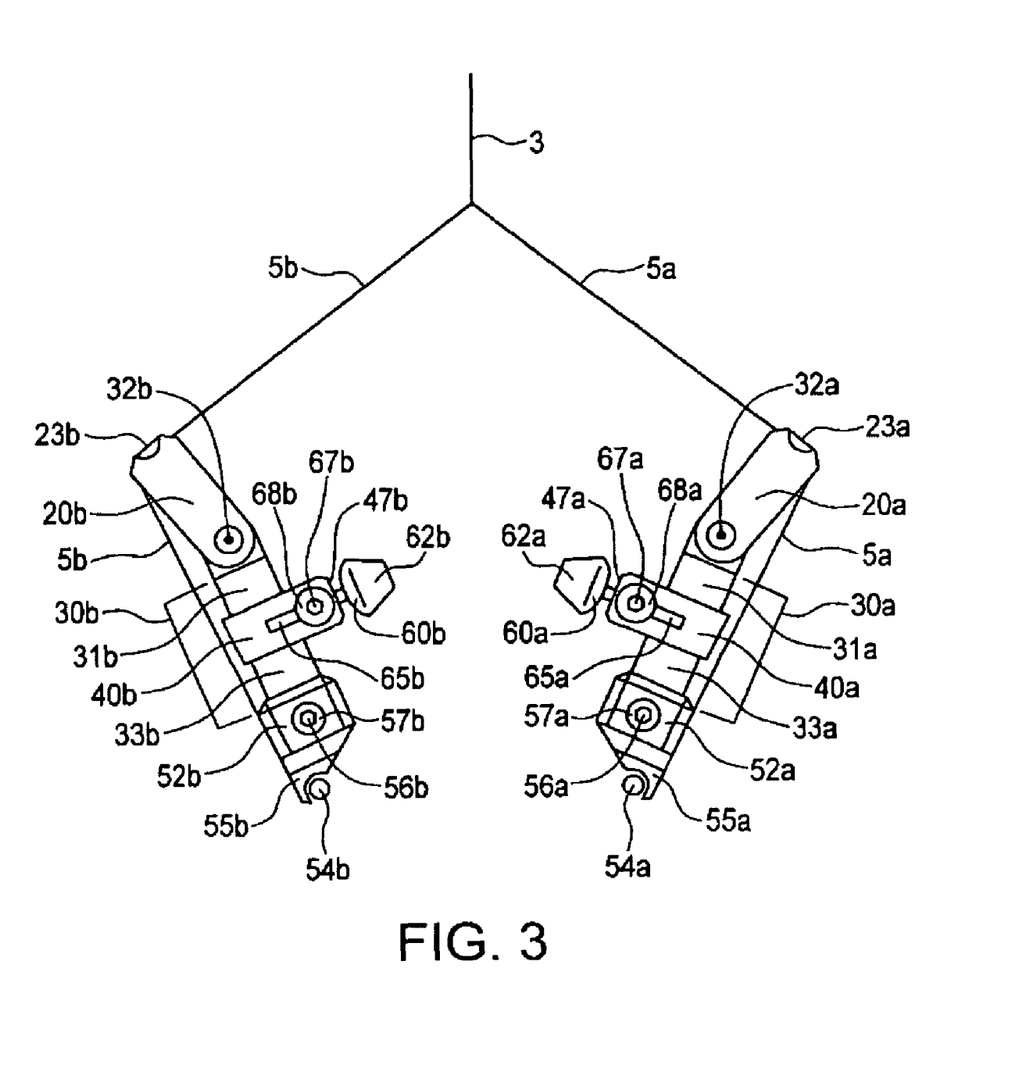
FIG. 3 is a front view of a cantilever brake device of the present invention.

FIG. 3 is a front view of a cantilever brake device 10 of the present invention and provides an example of the cantilever brake device 10 with the transverse cables 5a, 5b attaching or anchoring at the bottom trunk portions 55a, 55b on the lower end of the cantilever brake device 10. Braking action is provided by pulling on the main cable 3, thereby pulling on the transverse cables 5a, 5b, with each transverse cable 5a, 5b removably attached to the bottom trunk portions 55a, 55b of the cantilever brake device 10, and bringing the brake shoes 60a, 60b and brake pads 62a, 62b into contact with the rim surfaces 150a, 150b of the bike tire 100 on each side. Pulling the main cable 3 results in an inward movement of the brake pads 62a, 62b, which move into uniform contact with the rim surfaces 150a, 150b of the bicycle. By having the transverse cables 5a, 5b detachably link and anchor at the bottom trunk portions 55a, 55b which are distally located from the adjustable arm members 20a, 20b, cable tension and traction at the lower end affects the movement of the brake shoes 60a, 60b and brake pads 62a, 62b into contact with the rim surfaces 150a, 150b.

The commonly known practice of cantilever brake devices is anchoring the transverse cables 5a, 5b to the upper part of the device resulting in an upward movement of brake shoes into contact with the rim surfaces with an excessive roll angle occurring at the top of the brake pads rather than an even, inward movement of the brake shoes and brake pads against the rim surfaces. By moving the cable tension and traction point down to the distal and lower level at the bottom trunk portions 55a, 55b rather than having the traction point at the upper level of the adjustable arm members 20a, 20b, the braking force applied brings the brake shoes 60a, 60b and brake pads 62a, 62b inward, and evenly aligns the entire surface of the brake pads 62a, 62b into uniform contact with the rim surfaces 150a, 150b that results in greater braking tension, and performance of the brakes. With the current design, braking force is firmer, stronger and more uniform with the cable tension at the lower level by the bottom trunk portions 55a, 55b.

Additionally, the adjustable arm members 20a, 20b can accommodate any wider frames, preventing the brake shoes 60a, 60b from being excessively inwardly positioned far away from their shoe housing members 40a, 40b. By combining the adjustable feature of the arm members 20a, 20b to allow the body members 30a, 30b to be in close proximity to the rim surfaces 150a, 150b along with the brake shoes 60a, 60b and pushing the brake shoes 60a, 60b into contact with the rim surfaces 150a, 150b by cable traction at the distal, lower end of the bottom trunk portions 55a, 55b, the braking action results in superior and stable braking performance on any bicycle.

As more readily seen in FIGS. 3 and 4, the back sides of the brake shoes 60a, 60b are closely positioned against the inner side 47a, 47b of the shoe housing member 40a, 40b. The current design allows the inner side 47a, 47b of the shoe housing member 40a, 40b to further provide support behind the brake shoes 60a, 60b and brake pads 62a, 62b, particularly when the brakes are applied causing much stress and vibratory flexing of the brake pads 62a, 62b against the rim surfaces 150a, 150b. The inner side 47a, 47b of the shoe housing member 40a, 40b is sufficiently close to the brake shoes 60a, 60b to support the brake pads 62a, 62b from excessive flexing caused by braking action. This particular design also allows the shoe housing member 40a, 40b to provide additional support and rigidity to the flexing and vibrating brake pads 62a, 62b, and increases the braking power and force against the rim surfaces 150a, 150b. By adjusting the arm members 20a, 20b rather than moving the brake shoes 60a, 60b close to the rim surfaces 150a, 150b to accommodate wider fork frames, strength, support and rigidity are all maintained to provide increased braking power and force to the user. Close proximity of the inner side 47a, 47b of the shoe housing member 40a, 40b behind the brake shoes 60a, 60b lessens excessive flexing and vibrations of the brake pads 62a, 62b during use and also minimizes squealing noise caused by excessive flexing and vibrations.

FIG. 4 is a top view of a cantilever brake device 10 of the present invention shown on opposite sides of a bicycle wheel. The adjustable arm members 20a, 20b are easily adjustable by loosening or tightening the attachment 35a, 35b inserted through the bottom portion of the arm member 25a, 25b and the upper body portion 31a, 31b. The upper body portion 31a, 31b is only half of an upwardly extending cylindrical portion with a round spherical head from the body member 30a, 30b. The bottom portion of the arm member 25a, 25b with a disc-like shape extends downwardly from the arm member 20a, 20b that matches and fits with the upper body portion 31a, 31b when the body of the attachment 35a, 35b connects the arm member 25a, 25b and the upper body portion 31a, 31b together through an opening (not shown in any figures). Each head of the attachment 35a, 35b with threaded body portion has a similar recess (not shown in FIG. 4) as the connector 57a, 57b at the front side that is hexagonally shaped through which an allen wrench or a similar tool can be easily used to tighten or loosen the attachment 35a, 35b against an inner threaded portion of the opening of the upper body portion 31a, 31b. The end of the attachment 32a, 32b can be readily seen in FIGS. 1, 2, and 3 which is fully threaded through the opening of the bottom portion of the arm member 25a, 25b and the upper body portion 31a, 31b. An optional washer can be placed between the head of the attachment 35a, 35b and the bottom portion of the arm member 25a, 25b. Alternatively, a washer with frictional edges or other shaped edges can be positioned between the bottom portion of the arm member 25a, 25b and the upper body portion 31a, 31b for additional friction and support to hold the attachment 35a, 35b and the adjustable arm members 20a, 20b after the head of the attachment 35a, 35b is tightened using an allen wrench or a similar tool.

The brake pads 62a, 62b are in close proximity to the rim surfaces 150a, 150b (as shown in FIG. 2) on the bicycle wheel. Further, the shoe housing member 40a, 40b is positioned closely behind the brake shoes 60a, 60b to provide additional support and rigidity to reduce the squeaking noise due to flexing of the brake pads 62a, 62b at high speeds as the bicycle is slowing down or halting completely. The adjustable arm members 20a, 20b accommodate the wider fork of a bicycle frame and maintain the brake shoes 60a, 60b closer to the body members 30a, 30b (not shown in FIG. 4) and shoe housing members 40a, 40b for providing stronger braking force when the brakes are applied. The brake pads 62a, 62b are firmly brought into contact with the rim surfaces 150a, 150b (not shown in FIG. 4), and the inner side 47a, 47b of the shoe housing member 40a, 40b provides additional rigidity and support to the braking action which is highly preferred.

As shown in FIG. 4, the channel 42a, 42b is widened or narrowed depending on the tightening and adjustment of the fastener 66a, 66b on the end portion of the attaching means 68a, 68b after vertical adjustment and pitch angle of the brake shoes 60a, 60b are adjusted. Tightening of the fastener 66a, 66b further pushes the spacer 69a, 69b against the brake support 65a, 65b to tightly engage the brake shoes 60a, 60b in place. The roll angle of the brake shoes 60a, 60b may be adjusted prior to tightening the fastener 66a, 66b that sets the shoe housing member 40a, 40b and the brake shoes 60a, 60b in place for fine tuning and fine adjustment of the brakes. Upon adjustment of the arm members 20a, 20b and the shoe housing members 40a, 40b and the brake shoes 60a, 60b, the brake pads 62a, 62b are uniformly and evenly brought against the rim surfaces 150a, 150b when the brakes are activated by a bicyclist. The cantilever brake device 10 can be made from steel, titanium, carbon fiber, other metals, a combination of metals, alloys, or a combination of materials to withstand the pressure from the rigors of bicycling.

In compliance with statute, the invention has been described in language more or less specific as to cantilever brake devices. It is to be understood, however, that the invention is not limited to the specific means or features shown or described, since the means and features shown or described comprise preferred ways of putting the invention into effect.

The terms and expressions that have been employed in the foregoing specification are used as terms of description and not of limitation and are not intended to exclude equivalents of the features shown and described or portions of them.

What is claimed is:

1. A cantilever brake device for a bicycle, comprising a pair of opposing brake arm assemblies, with each brake arm assembly comprising:
    a) an adjustable arm member comprising a cylindrical top portion with an upper surface with a slit for receiving a transverse cable that fits therethrough;
    b) a body member wherein the arm member adjustably attaches to an upper body portion of the body member and the body member is located immediately below the arm member;
    c) a shoe housing member rotatably and adjustably mounted on the body member for supporting a brake shoe with a brake pad;
    d) a trunk portion at a distal end of the body member with a front end and a back end, which trunk portion comprises a bottom trunk portion with an inlet at the distal end to detachably receive and secure the transverse cable and is pivotally attached to a fork frame of the bicycle;
    e) a coil spring attached to the trunk portion, biased to maintain the brake arm assembly in an open, non-braking position; and
    f) a spring adjuster attached to the trunk portion for adjusting the coil spring tension.

2. The cantilever brake device of claim 1, wherein the adjustable arm member comprises a bottom portion that attaches to the upper body portion by an attachment that is pivotally adjustable through a range of angles from the body member to accommodate the width of the fork frame.

3. The cantilever brake device of claim 2, wherein the attachment of the bottom portion of the arm member to the upper body portion is pivotally adjustable so as to reduce noise caused by excessive deflection of a brake pad for alignment with a rim surface of the bicycle.

4. The cantilever brake apparatus of claim 1, wherein the body member comprises a cylindrical shape over which the shoe housing member is mounted for rotating around the body member and moving in a vertical direction for positioning of the brake pad for alignment with the rim surface of the bicycle.

5. The cantilever brake apparatus of claim 1, wherein the shoe housing member is substantially a U-shaped structure with a near side, a distal side and an inner side that wraps around the body member with an opening on a z-axis to accommodate an attaching means therethrough.

6. The cantilever brake device of claim 5, wherein the attaching means comprises a head portion with an opening through which a brake support is positioned laterally through the opening of the head portion prior to tightly engaging the brake support to the shoe housing member.

7. The cantilever brake device of claim 6, wherein a spacer is positioned between the near side of the shoe housing member and the head portion of the attaching means to push against the brake support for tightly engaging the brake support with the shoe housing member.

8. The cantilever brake device of claim 5, wherein a fastener is used on the distal side of the shoe housing member to threadably engage the attaching means and the brake support with the shoe housing member.

9. The cantilever brake device of claim 5, wherein the inner side of the shoe housing member is sufficiently close to the brake shoe to support the brake pad from excessive flexing caused by braking action.

10. The cantilever brake device of claim 1, wherein the brake shoe is adjustable in a horizontal direction by moving a brake support closer to a rim surface prior to tightly engaging a fastener with an attaching means and the brake support with the shoe housing member.

11. The cantilever brake device of claim 1, wherein the brake shoe is rotatably adjustable in a vertically angular direction prior to tightly engaging the fastener with the attaching means and the brake support with the shoe housing member.

12. The cantilever brake device of claim 1, wherein pulling the cable results in an inward movement of the brake pad sufficient to bring the brake pad into uniform contact with the rim surface of the bicycle.

13. A cantilever brake device for a bicycle, comprising a pair of opposing brake arm assemblies, with each brake arm assembly comprising:
    a) an adjustable arm member with substantially a cone shape comprising a cylindrical top portion with an upper surface with a slit for receiving a transverse cable, a cylindrical body portion and a disc-like bottom portion;
    b) a body member with substantially a cylindrical shape comprising an upper body portion with an upwardly protruding half-cylindrical shape, a lower body portion with a cylindrical shape wherein the upper body portion adjustably attaches to the bottom portion of the arm member by an attachment and the body member located immediately below the arm member;
    c) a shoe housing member that is substantially a U-shaped structure, the shoe housing member being rotatably and adjustably mounted on the body member for holding a brake shoe with a brake pad perpendicularly positioned through a head portion of an attaching means;
    d) the attaching means comprising the head portion, a body portion, and a threaded end portion, the body portion inserted through an opening of the shoe housing member on a z-axis, the end portion to which a fastener is threadably and tightly engaged to hold the shoe housing member and the brake support with a spacer placed between the shoe housing member and the brake support after adjustment;
    e) a trunk portion at a distal end of the body member with a front end and a back end wherein the back end of the trunk portion attaches to a fork frame of a bicycle with a connector, the trunk portion comprising a bottom trunk portion with an inlet for latching the cable;
    f) a coil spring attached to the trunk portion, biased to maintain the brake arm assembly in an open, non-braking position; and
    g) a spring adjuster attached to the front end of the trunk portion by a connector for adjusting a coil spring tension.

14. The cantilever brake device of claim 13, further comprising a washer with frictional edges positioned between the bottom portion of the arm member and the upper body portion prior to tightening the attachment to securely engage the two portions.

15. The cantilever brake device of claim 13, further comprising a washer positioned between the head portion of the attachment and the bottom portion of the arm member prior to tightening the attachment to securely engage the two portions.

16. The cantilever brake device of claim 13, wherein the bottom portion of the arm member that attaches to the upper body portion by the attachment is pivotally adjustable through a range of angles from the upper body portion of the body member to accommodate the width of the fork frame of a bicycle.

17. The cantilever brake device of claim 13, wherein the U-shaped structure of the shoe housing member comprises a flat surface on a near side and a flat surface on a distal side with the body portion of the attaching means inserted through the opening from the near side to the distal side.

18. The cantilever brake device of claim 17, wherein a spacer is placed between the head portion of the attaching means and the near side of the shoe housing member to push against the brake support for tightly engaging the brake support with the shoe housing member.

19. The cantilever brake device of claim 13, wherein the shoe housing member comprises an inner side that is positioned sufficiently close to the brake shoe to support the brake pad from excessive flexing caused by braking action.

20. The cantilever brake device of claim 13, wherein the brake shoe is adjustable in a horizontal direction by moving the brake support closer to the rim surface prior to tightly engaging the fastener with the attaching means and the brake support with the shoe housing member.

\* \* \* \* \*